(12) United States Patent
Giuliani

(10) Patent No.: US 7,703,264 B2
(45) Date of Patent: Apr. 27, 2010

(54) MACHINE AND METHOD FOR PACKAGING GROUPS OF PRODUCTS

(75) Inventor: Nicola Giuliani, Bologna (IT)

(73) Assignee: KPL Packaging S.p.A., Bologna (IT)

( * ) Notice: Subject to any disclaimer, the term of this patent is extended or adjusted under 35 U.S.C. 154(b) by 136 days.

(21) Appl. No.: 12/083,601

(22) PCT Filed: Jun. 4, 2007

(86) PCT No.: PCT/IT2007/000391

§ 371 (c)(1),
(2), (4) Date: Apr. 15, 2008

(87) PCT Pub. No.: WO2007/144920

PCT Pub. Date: Dec. 21, 2007

(65) Prior Publication Data

US 2009/0113849 A1 May 7, 2009

(30) Foreign Application Priority Data

Jun. 16, 2006 (IT) ............... FI2006A0152

(51) Int. Cl.
B65B 35/58 (2006.01)
B65B 9/06 (2006.01)
B65G 47/244 (2006.01)

(52) U.S. Cl. ............... 53/446; 53/447; 53/450; 53/540; 53/544; 53/547; 53/550; 198/415; 198/416

(58) Field of Classification Search ............ 53/446, 53/447, 450, 479, 540, 544, 547, 550, 371.7, 53/372.5, 51, 493, 495; 198/411, 415, 416; B65B 35/56, B65B 35/58; B65G 47/244

See application file for complete search history.

(56) References Cited

U.S. PATENT DOCUMENTS

| | | | | |
|---|---|---|---|---|
| 1,417,591 A * | 5/1922 | Anderson | ............ | 53/550 |
| 2,605,597 A * | 8/1952 | Scheib | ............ | 53/550 |
| 3,432,023 A * | 3/1969 | Lucas | ............ | 198/416 |
| 4,672,792 A * | 6/1987 | Wallin | ............ | 198/415 |
| 5,191,962 A * | 3/1993 | Wegscheider et al. | ............ | 198/415 |
| 5,195,300 A * | 3/1993 | Kovacs et al. | ............ | 53/450 |
| 5,228,273 A * | 7/1993 | Kovacs | ............ | 53/479 |
| 5,255,495 A | 10/1993 | Kovacs | | |
| 5,291,720 A * | 3/1994 | Lashyro et al. | ............ | 53/544 |
| 6,151,867 A | 11/2000 | Focke et al. | | |
| 2006/0130435 A1* | 6/2006 | Hada et al. | ............ | 53/450 |

FOREIGN PATENT DOCUMENTS

| | | | |
|---|---|---|---|
| EP | 0 654 429 A1 | 5/1995 | |
| EP | 663339 A1 * | 7/1995 | |
| GB | 2 097 356 A | 11/1982 | |
| GB | 2 186 252 A | 8/1987 | |
| GB | 2224986 A * | 5/1990 | |
| JP | 52004396 A * | 1/1977 | |
| JP | 06278716 A * | 10/1994 | |
| WO | WO 03/064303 A1 | 8/2003 | |
| WO | WO 2005/080206 A1 | 9/2005 | |

* cited by examiner

*Primary Examiner*—Stephen F Gerrity
(74) *Attorney, Agent, or Firm*—Breiner & Breiner, L.L.C.

(57) ABSTRACT

To orient groups of products to be packaged in a plastic film the groups (G) are wrapped in lengths of film and fed between two series of opposite conveyor belts (211, 212). Each series of belts comprises several parallel belts controlled at proportionally variable speeds to cause the group (G) to rotate through approximately 90° about an axis orthogonal to the direction of feed.

24 Claims, 11 Drawing Sheets

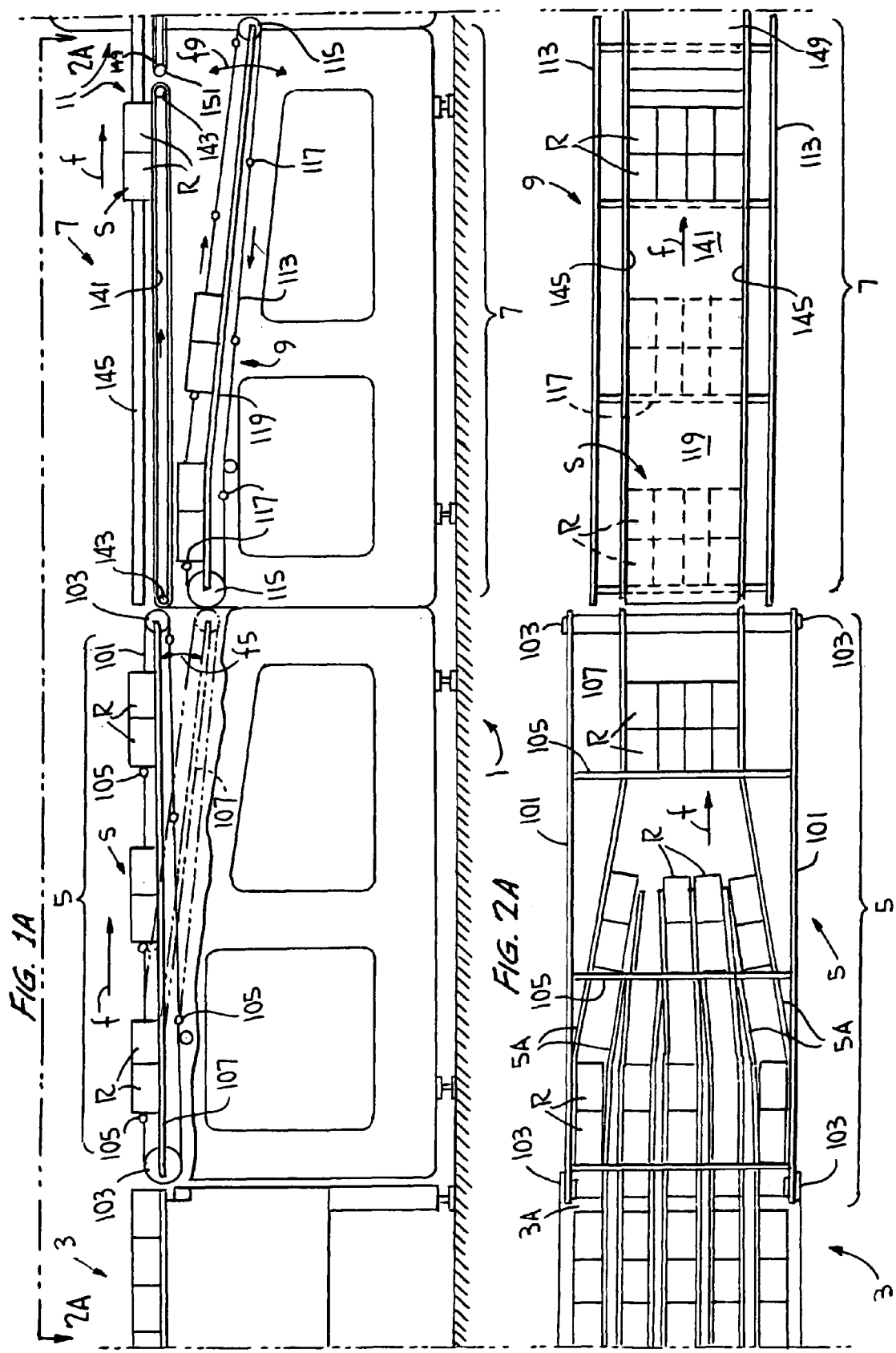

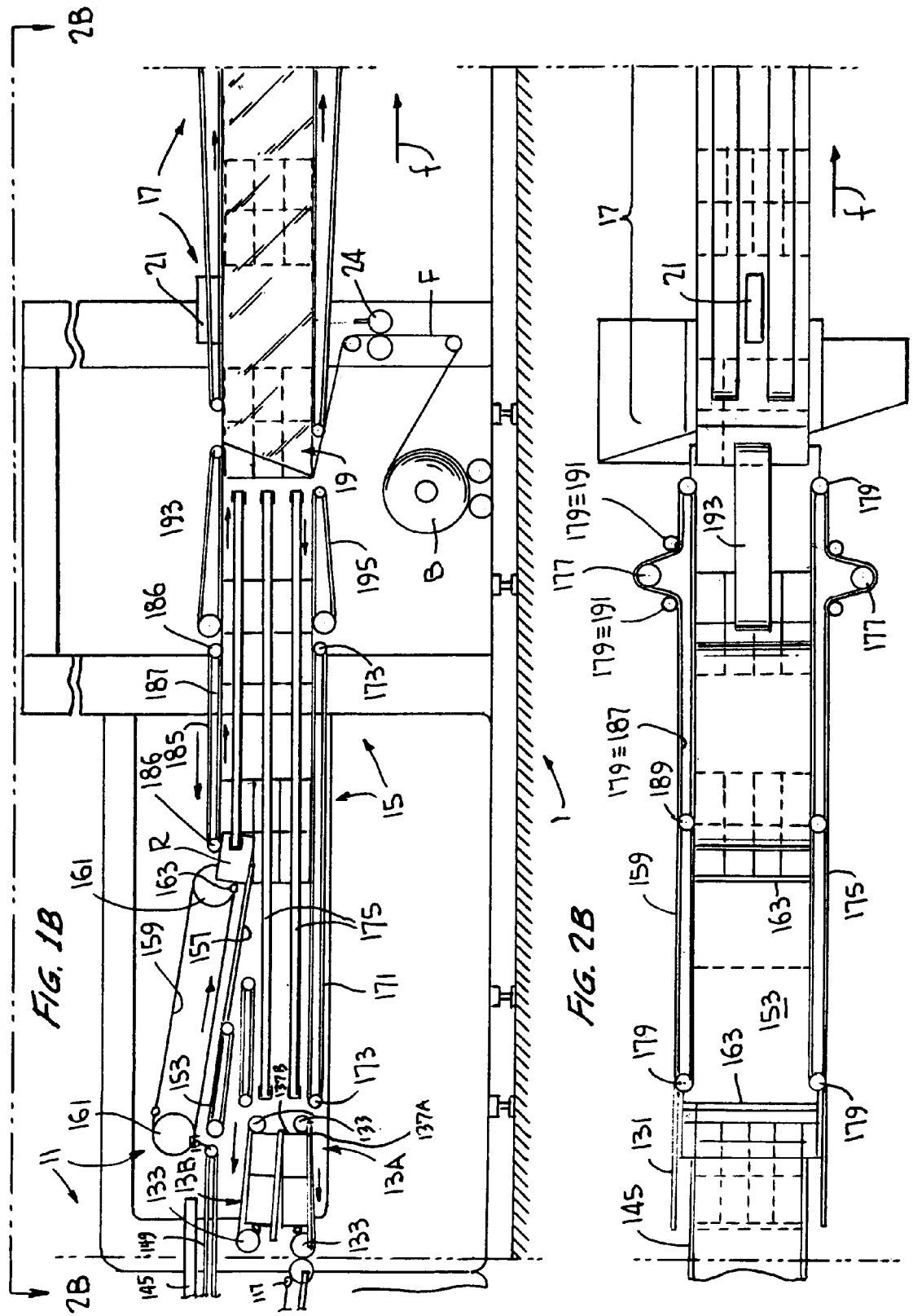

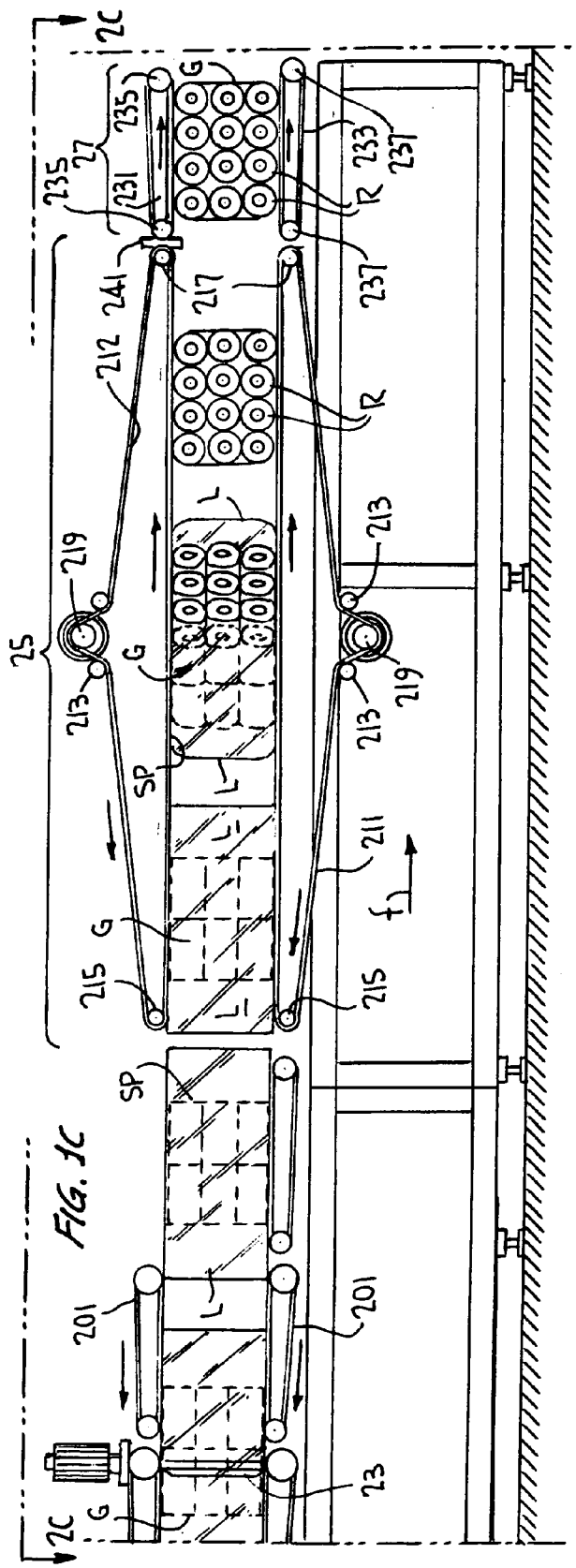
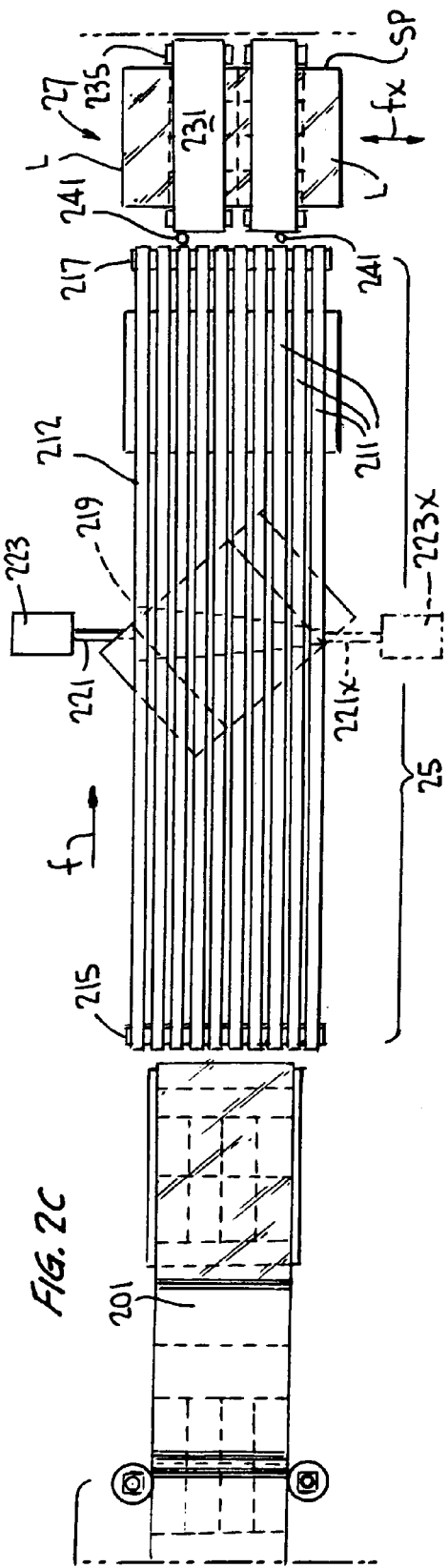
FIG. 1C
FIG. 2C

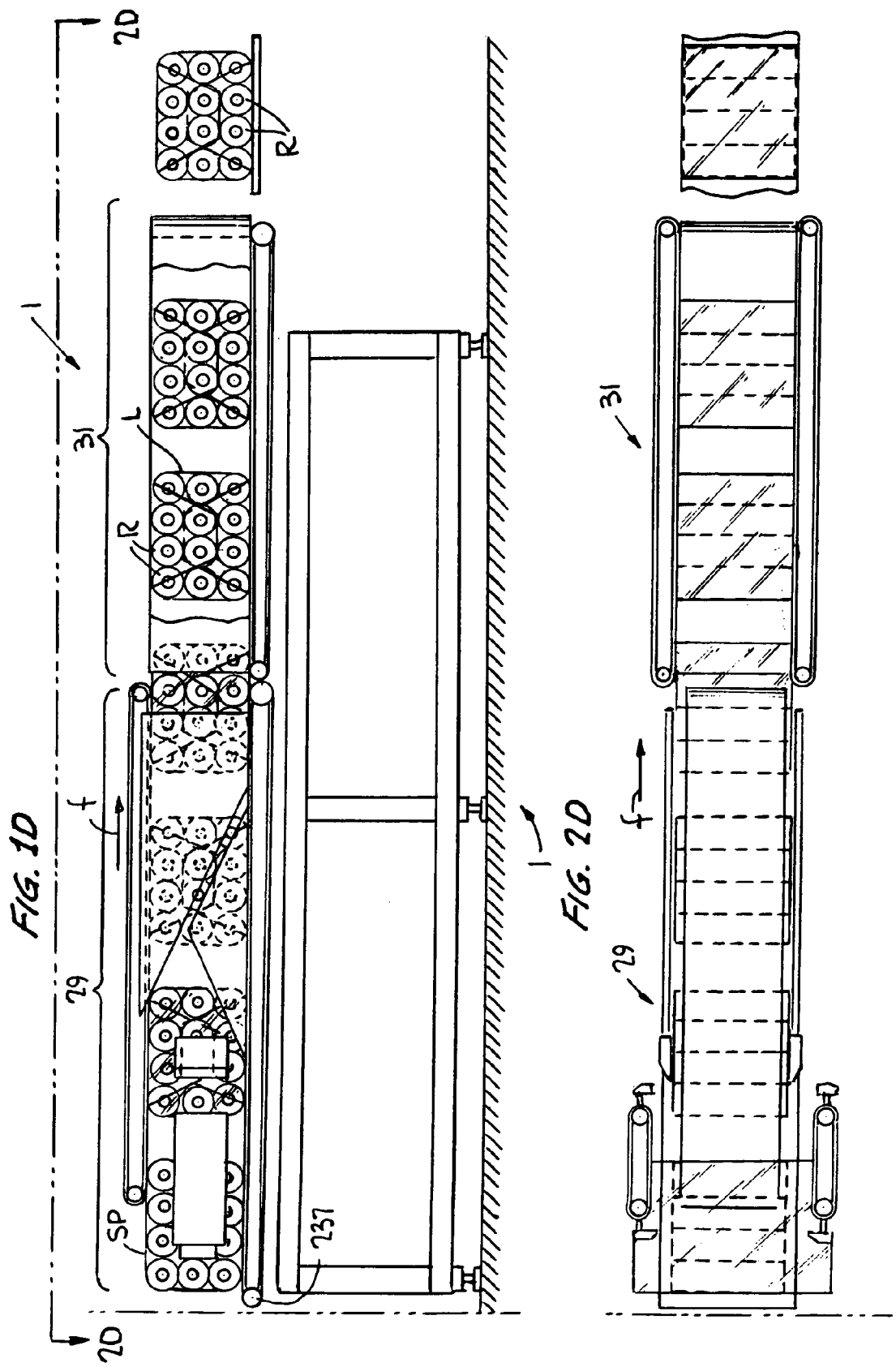

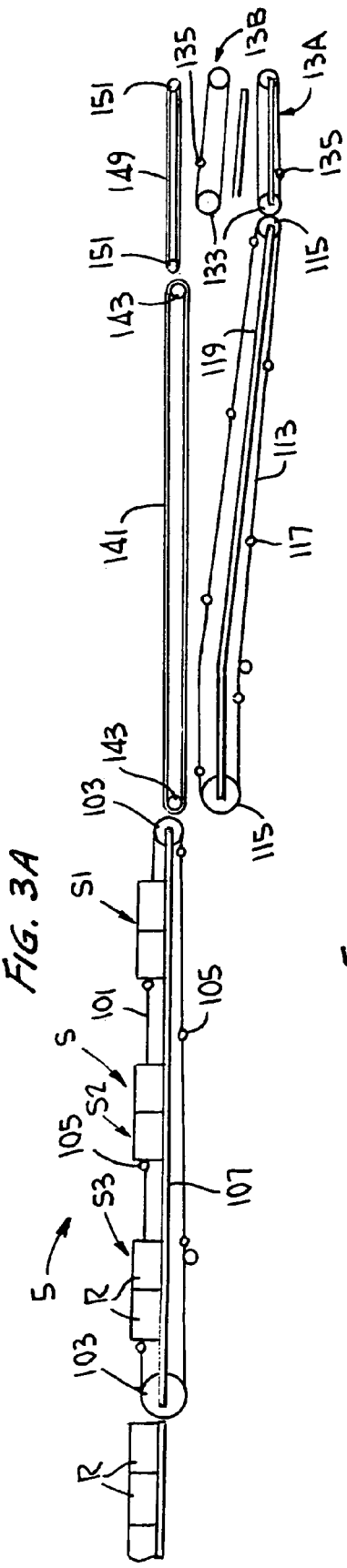
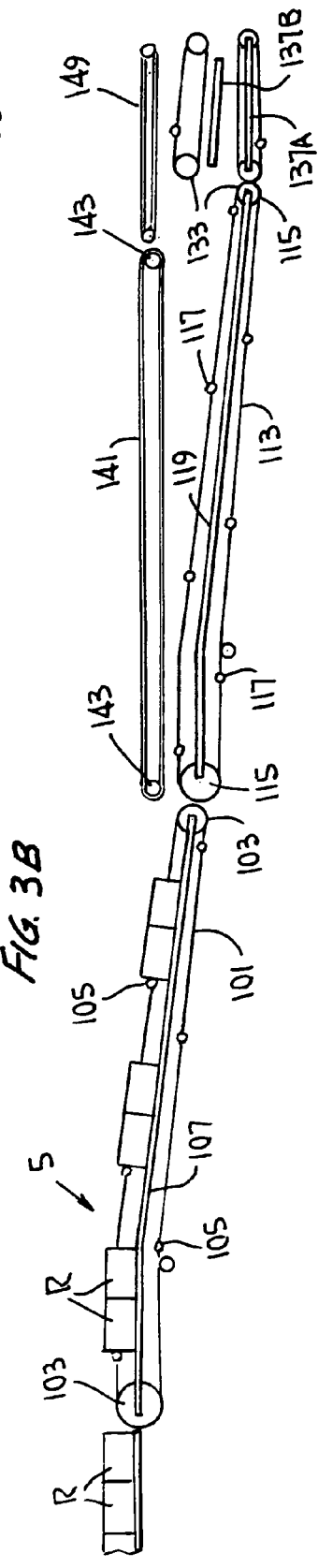
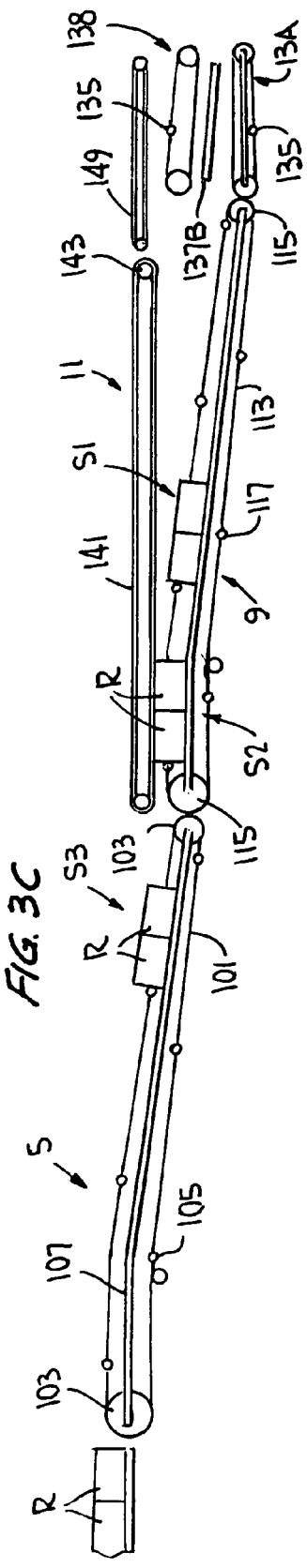

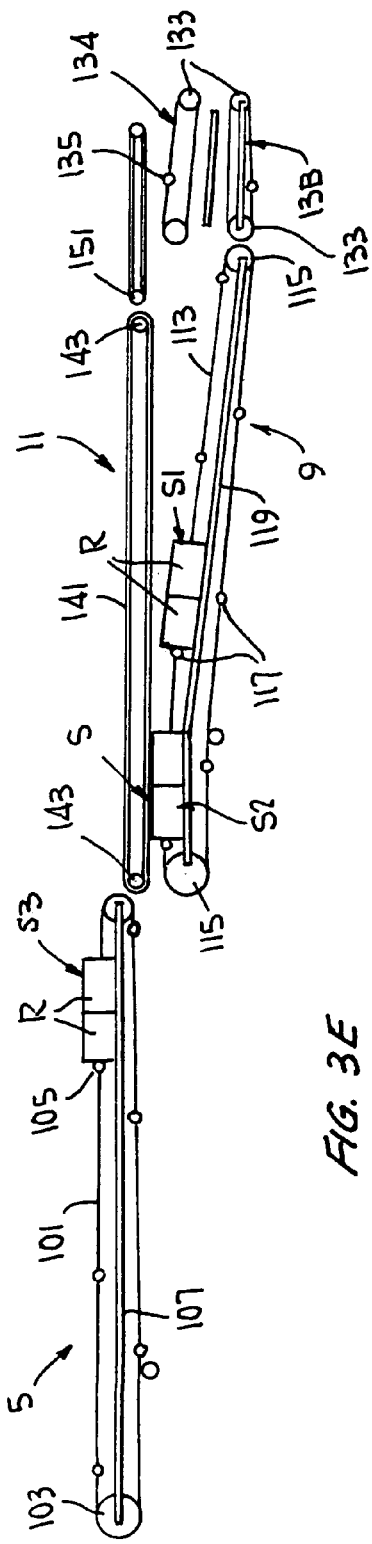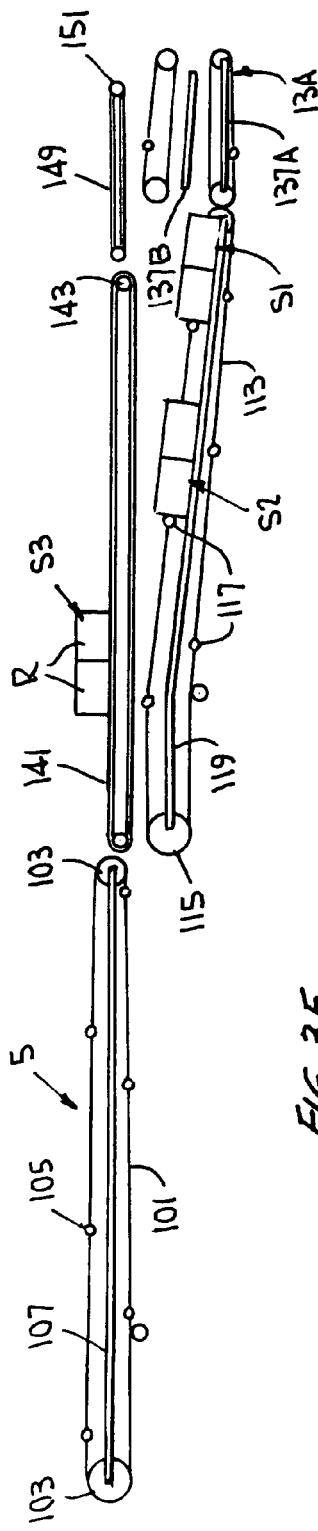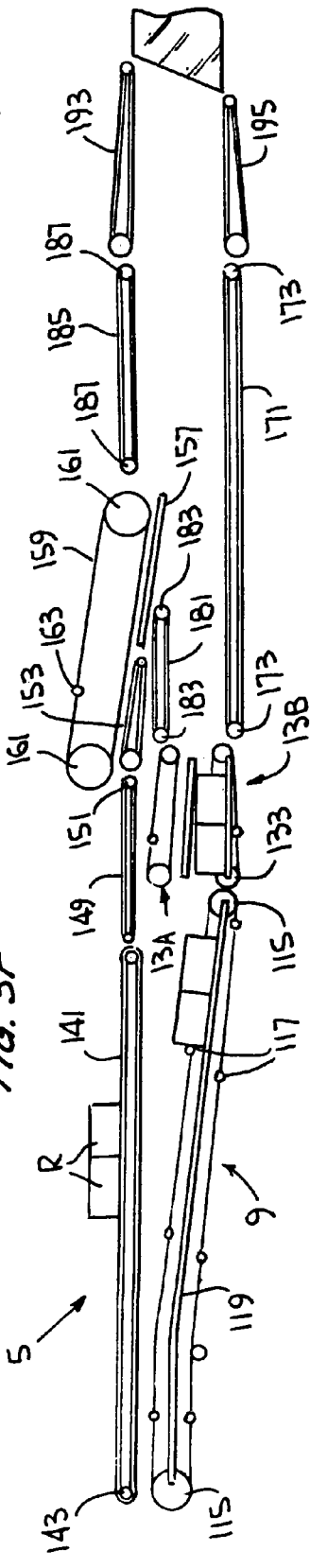

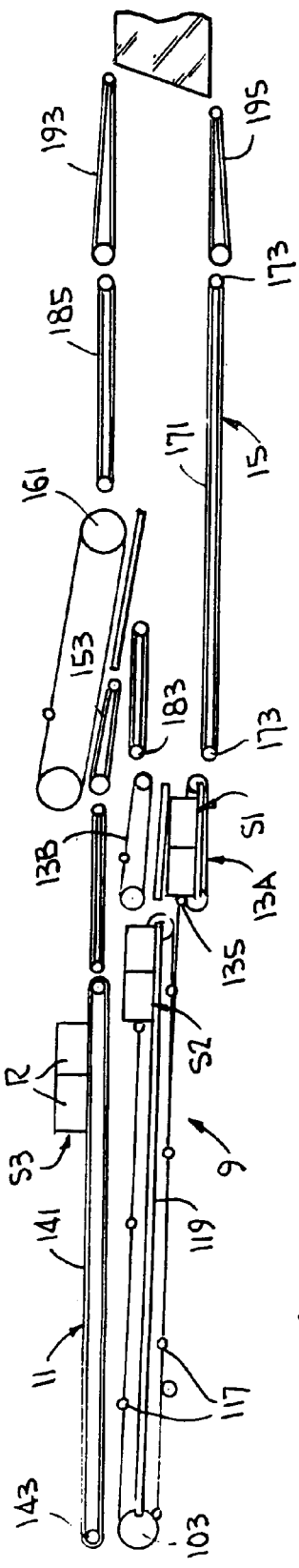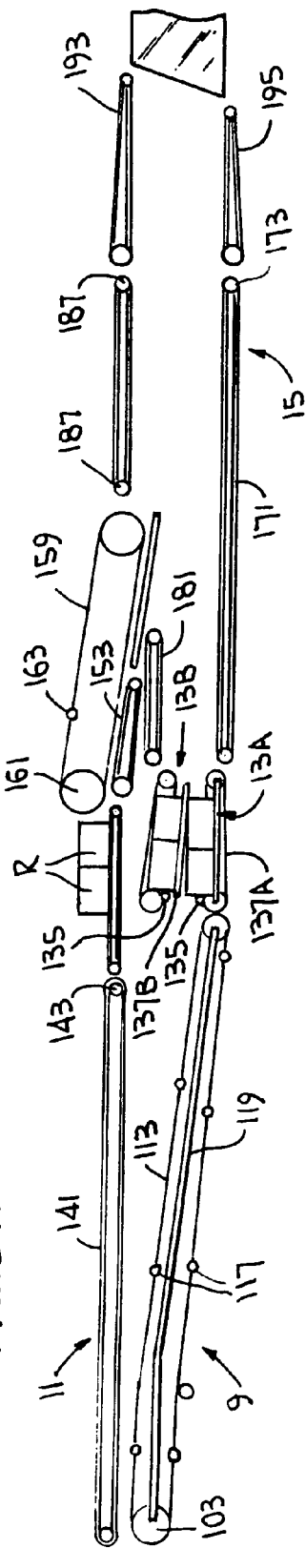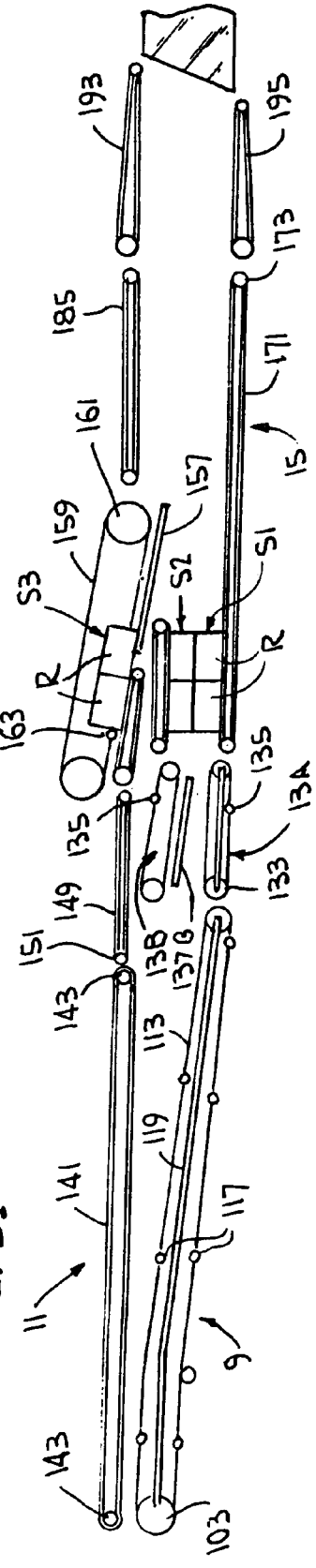

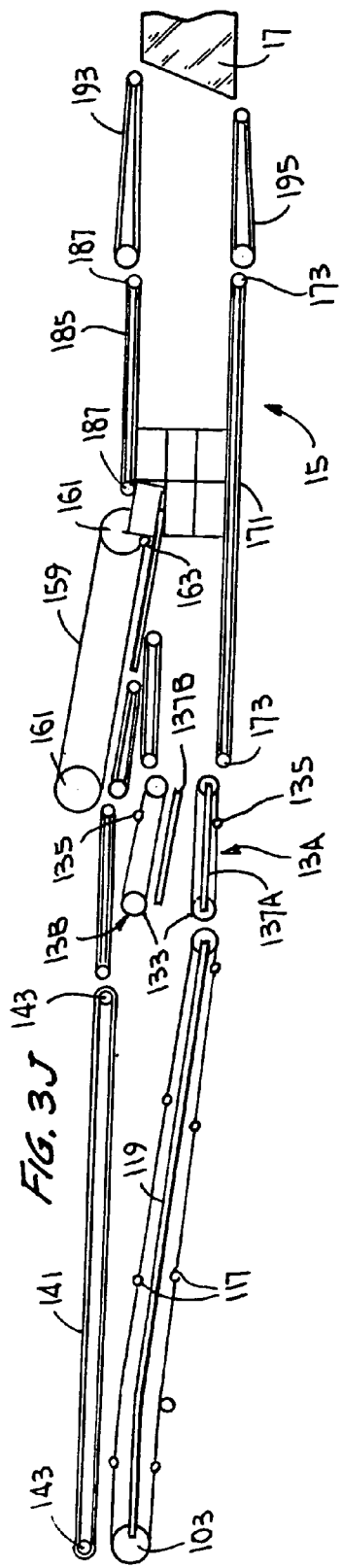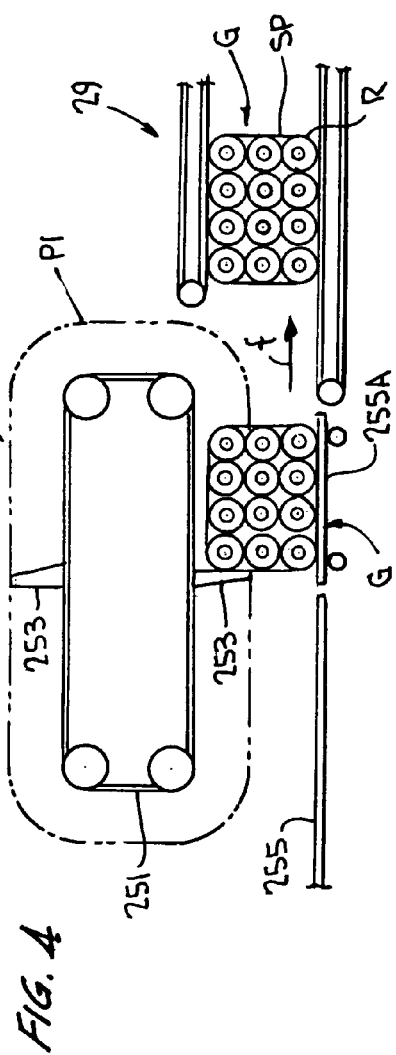
FIG. 3J    FIG. 3K    FIG. 4

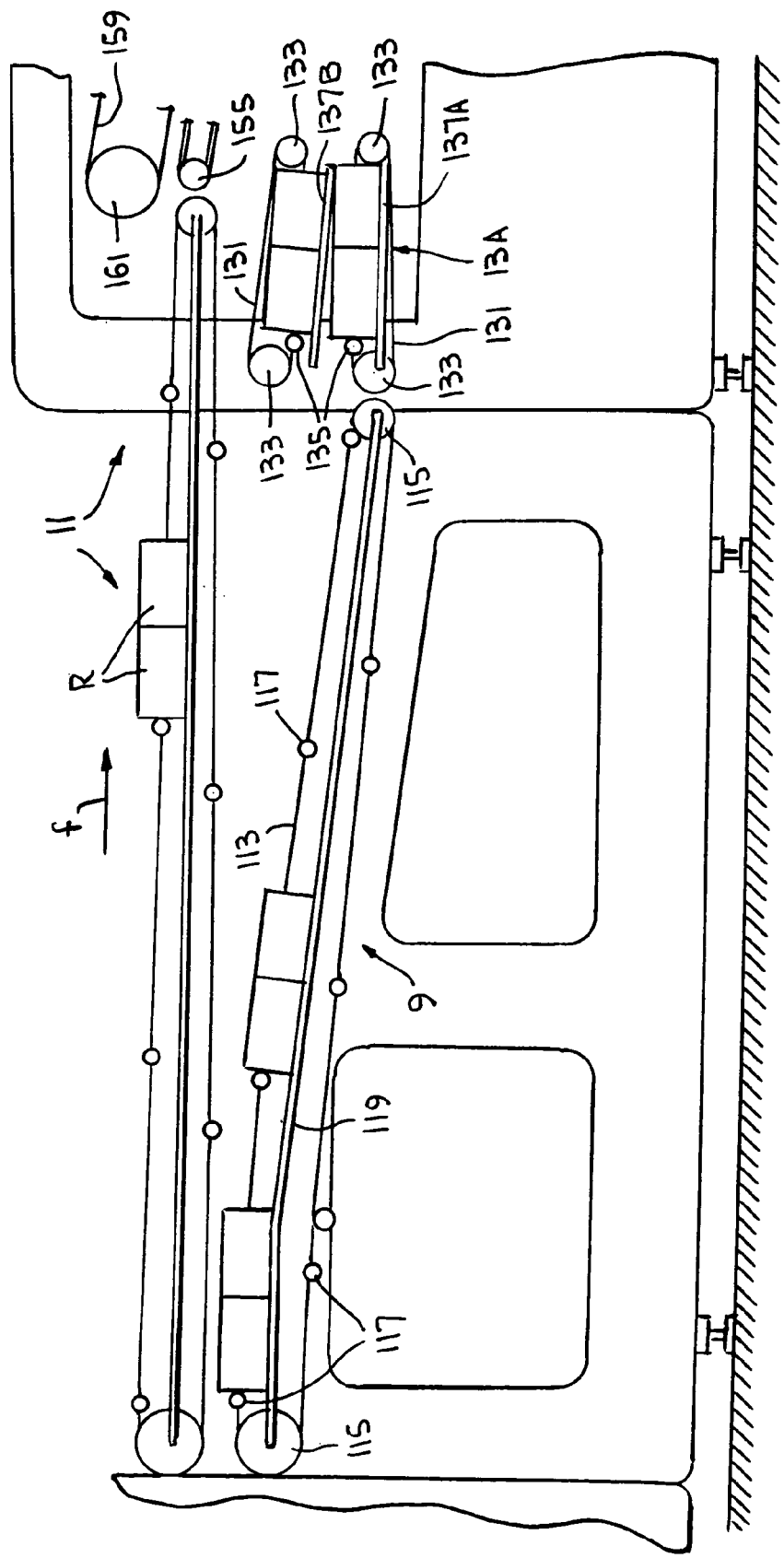

MACHINE AND METHOD FOR PACKAGING GROUPS OF PRODUCTS

TECHNICAL FIELD

The present invention relates to improvements to methods and machines for packaging products ordered according to superposed layers.

More specifically, although not exclusively, the invention relates to methods and machines for packaging rolls of tissue paper, such as toilet paper, kitchen paper or the like.

STATE OF THE ART

In the packaging industry there are frequently produced packs of products assembled in ordered groups and contained inside a wrapping made of plastic film. This technique is typically used to package rolls of tissue paper, such as toilet paper, kitchen paper or the like.

Normally, particularly when producing packs of rolls of tissue paper, single layers of product are fed according to a direction of feed and a plurality of layers are superposed to form a group of ordered products. This group of superposed layers is then introduced into a plastic film suitably shaped in the form of a tube by means of a forming collar or the like. The plastic film is unwound from a reel in a station upstream of the forming station and, along the path thereof, it is perforated by a suitable blade to favor subsequent separation. The tube of plastic film, obtained by sealing the longitudinal flaps of the film, is then separated, with suitable means, in a station downstream of the forming station, to obtain single semi-finished packs, formed by the outer tubular plastic film which encloses therein the group of ordered products and which has end flaps that must be folded and sealed or glued.

According to the prior art, to perform folding of the flaps of plastic film projecting from the group of articles it is required to impose on the group of articles a deviation of 90° in the direction of feed thereof, as the folding machines that fold and seal the side flaps of the film must act on the sides of the path along which the group of products is fed. The need to deviate the feed path of the groups of products by 90° causes drawbacks in terms of plant layout. In fact, the overall plane dimensions of the packaging line are relatively high.

Besides the drawbacks deriving from the overall dimensions of the packaging line in the plane, caused by the deviation of 90° in the feed path of the groups of products, a further drawback of conventional packaging lines is the limited efficiency of the devices that perform the 90° deviation in the path of the groups of products and consequently a limitation in the production rates that can be reached. Moreover, the semi-finished pack is subjected to sudden changes in direction which can compromise the quality of the result of the process and determine a physical limitation in the possibilities of increasing the products speed of current machines.

WO 03/064303 describes a system that is used in the field of packaging rolls of tissue paper to deviate by 90° the path of groups of products.

WO-2005/080206 describes a system for folding and sealing the side flaps of the pack of rolls.

EP A-0654429 describes the section of the packaging line that forms the groups of layers of products superposed on one another, which are then sent to the forming collar to which the plastic film is fed to form the tube that wraps the group of products.

OBJECTS AND SUMMARY OF THE INVENTION

An object of the present invention is to provide a packaging method that overcomes, entirely or in part, the aforesaid drawbacks.

A further object of the present invention is to provide a new and more efficient packaging machine or line.

The object of a preferred embodiment of the invention is to provide a machine that allows groups of products to be fed along a direction of feed without deviations, i.e. that makes it possible to provide a layout of the packaging line which, in a plan view, extends linearly according to a principal direction, improves the efficiency and does not limit development of the increase in packaging speeds.

According to a first aspect, in substance, according to the invention a method for packaging groups of ordered products by means of a sheet material (typically although not exclusively a plastic film) is provided, comprising the steps of:

feeding in sequence groups of ordered products along a feed path extending according to a direction of feed;

feeding each of said groups of ordered products through a forming member, disposed along said path, by means of which there is formed a tube of said sheet material containing groups of products disposing them in sequence of lengths not yet separated of said tube of sheet material;

separating the continuous tube of sheet material with the group of products therein according to lengths of sheet material which project with end flaps thereof in front of and behind the group of products with respect to the direction of feed of said group of products along said path;

downstream of said forming member, rotating each group of ordered products, with the respective length of tube of sheet material, by approximately 90° while it is fed along said feed path, to orient said group of ordered products so that said flaps are facing the sides of said feed path;

inserting said group of ordered products in a flap folding station, comprising folding members arranged at the sides of the feed path, to fold and close said flaps.

In substance, to obtain a substantially rectilinear path of the groups of ordered products a method is implemented, wherein said groups are inserted in a tube formed of a film of plastic or other sheet material, to each be wrapped in a length of said film. Feed of the group of products wrapped with the film then continues according to a substantially rectilinear path, along which the group of products is gradually rotated, while it advances and therefore without being subjected to stops and sudden deviations in path, about an axis substantially orthogonal to the direction of feed, so that the faces of the group of products, which were formerly aligned with the direction of feed, are facing the sides of the path. In this way the flaps of the plastic film are projecting laterally from the group of ordered products, to be subjected to the action of the folding and sealing members of a packaging station, of substantially known type.

According to a preferred embodiment of the invention, the groups of ordered products are rotated by means of an orienting conveyor which has continuous conveying elements substantially parallel to the direction of feed, controlled at different speeds from one another, to impose a rotation of the groups of ordered products while they are fed along the feed path under the effect of these conveying elements that cause gradual rotation thereof.

In a preferred embodiment of the invention, after orientation or rotation of 90° of the group of products there can advisably be provided a step to detect and correct any positioning errors of said groups of ordered products. For example, any angular positioning errors, e.g due to excessive or insufficient rotation with respect to the 90° required, can be detected. An embodiment of the method according to the invention also provides for correction of any translational (i.e. lateral positioning) errors which can cause the group of products to be disposed in a position not centered with respect to the path it must follow. Detection and correction of errors can take place according to various criteria, some of which will be described with reference to some embodiments illustrated hereunder.

According to a particularly advantageous embodiment of the method according to the invention, the products can be ordered by feeding single layers of products and then superposing various layers to obtain the required group of ordered products. For example, groups of two, three or four superposed layers can be produced. However, the method of the present invention can also be applied to groups of products formed of a single layer, i.e. of a single level of products.

When the group to be packaged is composed of a plurality of superposed layers, a particularly advantageous embodiment of the method according to the invention provides for superposing of the layers to take place along a feed path extending according to a substantially rectilinear direction of feed, there being performed along said feed path insertion of the single groups into the lengths of sheet material, rotation of said groups, folding and closing of said flaps.

According to a further aspect, the invention relates to a packaging machine for packaging groups of ordered products with a sheet material comprising, along a feed path of said groups extending according to a direction of feed:

a forming member, which forms a tube of sheet material, through which said feed path extends;

a folding station, downstream of said separator member, to fold flaps of said lengths of tube projecting from the group of ordered products, said folding station having folding members disposed at the sides of the feed path;

between said forming member and said folding station, an orienting conveyor configured to rotate each group of ordered products by approximately 90° while it is fed along said path, to orient said group of ordered products with the flaps of the length of sheet material facing the sides of the feed path, before said folding members act on said group of ordered products.

According to an advantageous embodiment, the forming member comprises (besides a forming collar proper, in which the plastic film or other sheet material is shaped to form a continuous tube): unwinding members for unwinding a reel of film, a perforator that transversely perforates the continuous sheet material coming from the reel; a separator member to divide the tube formed in the forming collar into single lengths of web material by breaking the continuous material along the perforation lines.

In a preferred embodiment of the invention, between the orienting conveyor and the folding station a corrector device is disposed, to correct any angular and/or transverse positioning errors of each group of ordered products delivered properly oriented from said conveyor.

According to an advantageous embodiment, between the orienting conveyor and the folding station a further corrector device is disposed, to correct any transverse positioning errors of each group of ordered products delivered from said conveyor oriented.

According to an advantageous embodiment, the orienting conveyor comprises a plurality of substantially parallel continuous flexible conveyor elements arranged side by side, controlled at different speeds from one another to cause feed and simultaneous rotation of said groups of ordered products.

For particularly accurate control of the group of products, in an improved embodiment of the invention the orienting conveyor comprises two series of flexible elements, disposed above and below the path of the groups of ordered products, with a symmetrical difference in speed between the two series of orienting conveyors, so that they exert on each group of products to be rotated a respective torque oriented in the same direction, i.e. a total of two unidirectional torques.

In a possible embodiment, the orienting conveyor comprises a first plurality of continuous flexible conveyor elements, substantially parallel to and side by side with one another, which are operated with different speeds from one another, the difference in speed between said flexible conveyor elements causing feed and simultaneous rotation of said groups of ordered products.

In a possible embodiment, the conveyor elements are driven around drive pulleys of proportionally different diameters keyed onto at least one motor shaft made to rotate, for example, by an independent motor. It would also be possible for motion to be obtained from a motor of a different section of the line. Alternatively, each conveyor element could be provided with its own motor, in which case the single conveyor elements do not require to be driven around pulleys with proportionally different diameters, as the difference in speed can be imposed by acting on the electronic controls of the motors. It would also be possible to provide mixed solutions, where two or more motors control the rotation of two or more groups of pulleys on which corresponding conveyor elements are driven. For example, two aligned motor driven shafts, each equipped with a plurality of pulleys of proportionally different diameters, could be provided. The use of two motors eliminates the high costs of providing a motor for each flexible conveyor element while increasing the control flexibility of the orienting conveyor, for example, also to correct any angular positioning errors.

Hereunder the invention will be described in an application in combination with a particular and innovative system for forming groups of products ordered according to a plurality of superposed layers. However, it must be understood that invention can also be implemented in a packaging line in which groups of products with a single layer are formed, i.e. with products disposed on only one level, or in a packaging line in which a different system for superposing of the layers forming each group is used.

BRIEF DESCRIPTION OF THE DRAWINGS

The invention will be better understood by following the description and accompanying drawing, which shows a non-limiting practical example of the invention. In the drawing.

FIGS. 1A-1D show a side view of the packaging line in which the invention is incorporated. The various FIGS. 1A, 1B, 1C, 1D show successive portions of the same line which, as a whole, extends in a substantially rectilinear direction;

FIGS. 2A-2D show a plan view of the portions of line in FIGS. 1A-1D;

FIGS. 3A-3K show an operating sequence of the first portion of the line, to illustrate the manner in which a group of products in superposed layers is formed;

FIG. 4 shows a variant of embodiment of a section of the line;

FIG. 7 shows an enlargement analogous to the one in FIG. 5 of a modified embodiment of a portion of the line.

DETAILED DESCRIPTION OF AN EMBODIMENT OF THE INVENTION

Figure 5:
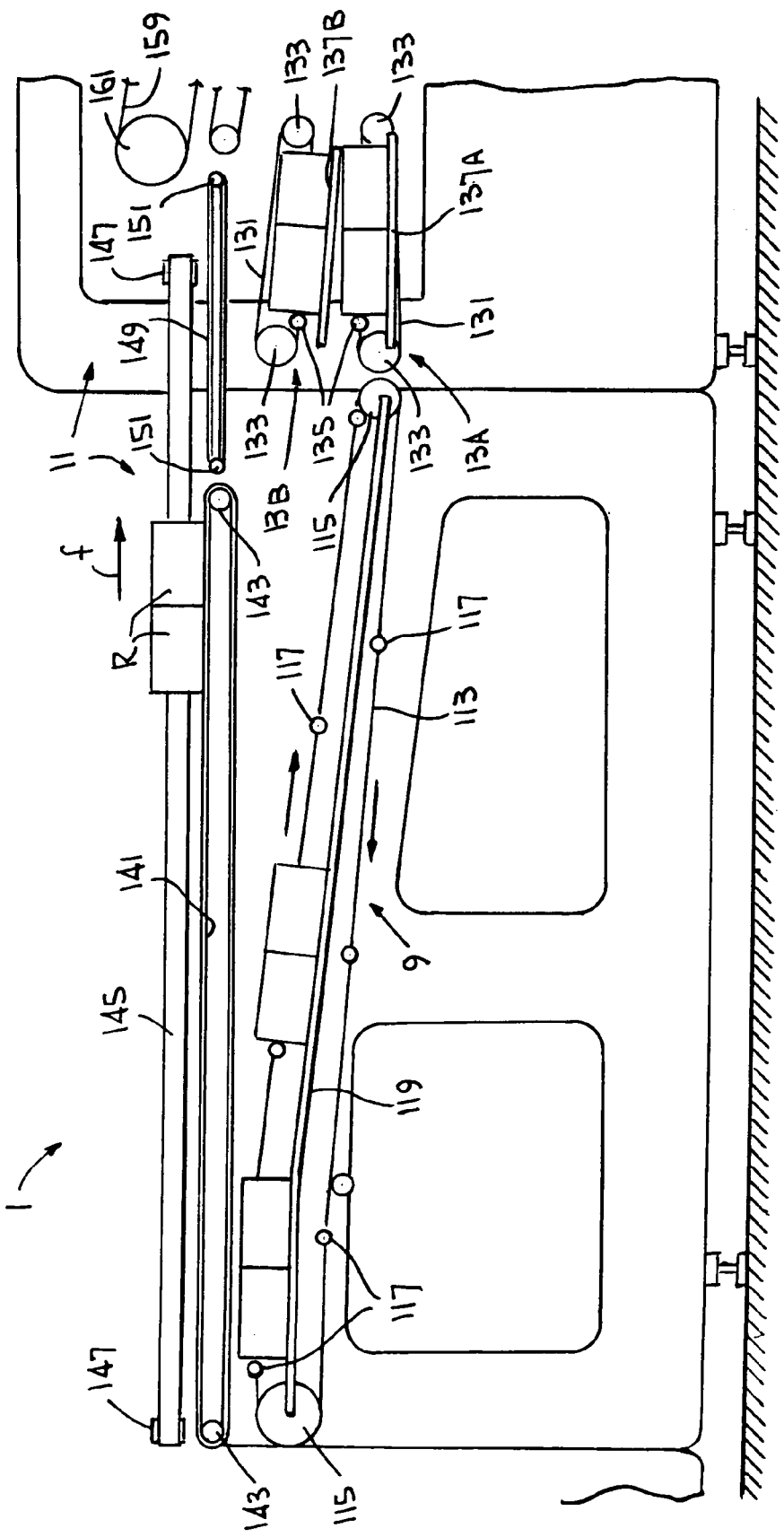
FIGS. 5 and 6 show enlargements of two portions of the line.
Figure 6:
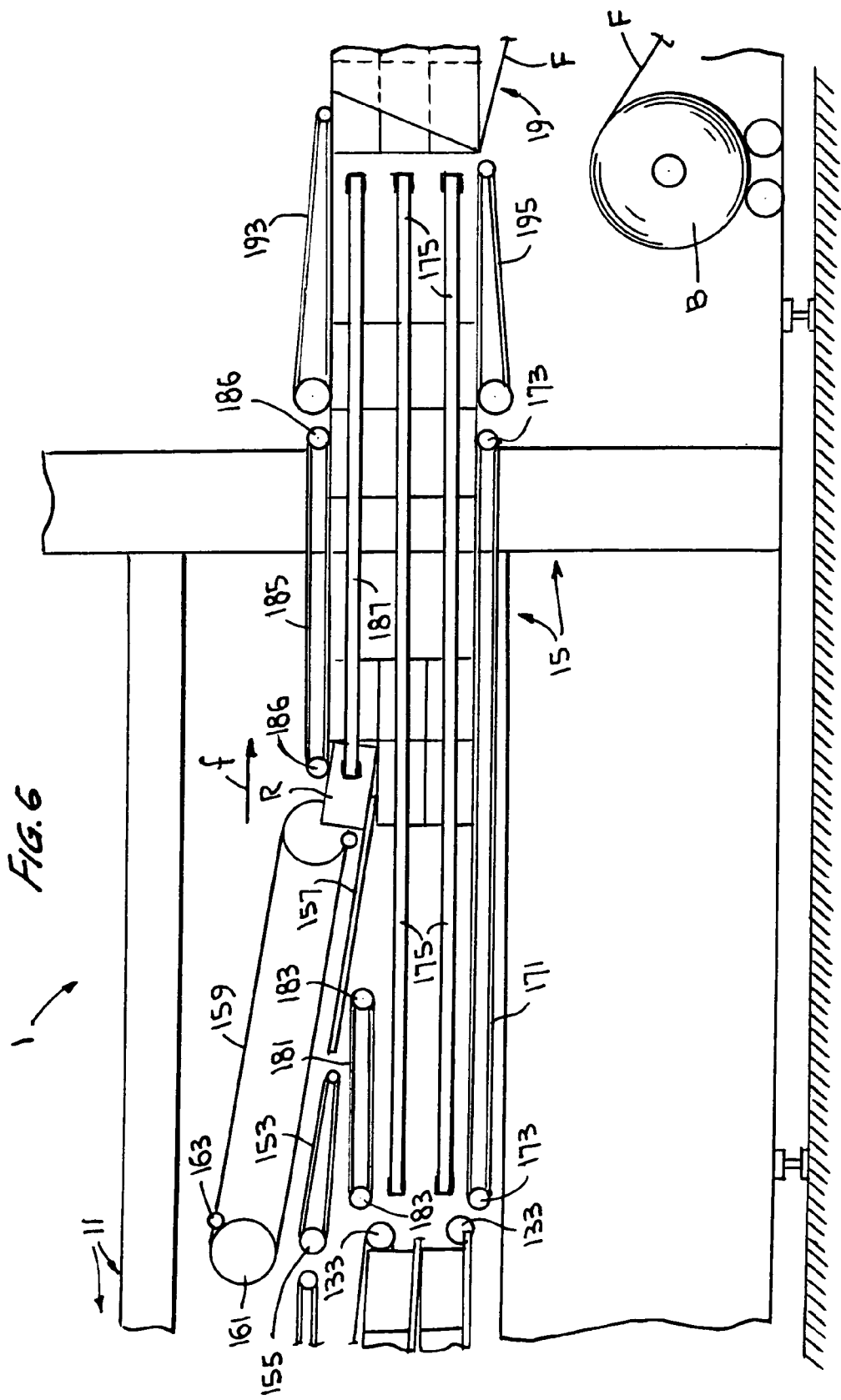

Before describing in detail the structure of the various sections of which a packaging line according to the invention is composed, and the operation thereof, the single sections of which it is composed will be briefly illustrated.

The line, indicated as a whole with 1, comprises a first portion 3 in which conveyor is arranged, which, in the example illustrated, has five substantially parallel channels 3A, along which there are fed rows of products to be ordered into groups and packaged. The example illustrated shows rolls of tissue paper R, but it must be understood that the principles underlying the invention can be applied to lines for packaging other types of products.

Downstream of the conveyor 3 a first feed conveyor 5 is arranged, along which single layers of products are disposed spaced from one another, preferably at a constant distance. In the example shown, each layer comprises four adjacent rows of two rolls each. Associated with the conveyor 5 there are guide and baffle plates 5A that deflect, toward the median axis of said conveyor, the single rows of rolls coming from the conveyor 3. The structure of the conveyor 5, just as that of the remaining sections forming the packaging line, will be described in greater detail hereunder.

Along the feed path of the products or rolls R, which extends according to a principal direction, i.e. according to a rectilinear trend in the plan view, downstream of the conveyor 5 there is provided a section 7 (FIGS. 1A, 2A), in which a second conveyor 9 and a third conveyor 11 are located. The two conveyors 9 and 11 are arranged at different heights, the conveyor 11 being placed above the conveyor 9. The conveyor 11 is actually formed by a plurality of single conveying elements, described in greater detail hereunder.

Downstream of the conveyor 9 there are disposed two superposed conveyors 13A and 13B (shown both in the right part in FIGS. 1A, 2A and in the left part in FIGS. 1B, 2B) which receive the products fed from the conveyor 9. Downstream of the conveyors 13A, 13B a delivery conveyor 15 is arranged, which extends, with the various components of which it is formed, to a forming member 17 (FIGS. 1B, 2B) in which, in a manner known per se, a tube is formed from a flat plastic film F unwound from a reel B and perforated by a perforator 24 according to transverse perforation lines.

The forming member 17 has a forming collar 19, around which the film F is fed and curved to form the tube and associated with which is a sealing member 21 which performs sealing of the longitudinal flaps of the film F to stabilize the tube inside which groups G of products R ordered in layers S coming from the conveyors upstream are inserted. The forming member 17 is also provided with a device 23 which, in a manner known per se, separates single lengths of tube formed by the film F, each of which wraps a respective group G of products ordered and fed inside and through the forming member 17.

Downstream of the forming member 17 an orienting conveyor 25 is arranged (FIGS. 1C, 2C), along which the single groups of ordered products inserted inside the respective lengths of plastic film tube are rotated through approximately 90° about a substantially vertical axis while they are fed along the feed path according to the direction of feed f, along which the entire packaging line extends.

Downstream of the orienting conveyor 25 is a corrector device 27, which corrects the angular and transverse position of each single group of products or rolls R coming from the orienting conveyor 25. Downstream of the corrector device 27 a folding station 29 is arranged (FIGS. 1D, 2D), of type known per se, followed by a station 31 for sealing the folded flaps of the pack of film that wraps the group G of packed products. The stations 29 and 31 have a conformation and a structure known per se, and will not be described herein. For example, the stations 29 and 31 can be designed as described in WO-A-2005/080206, the content of which forms an integral part of the present description and which can be referred to for further information on the methods of implementation of these two sections of the packaging line. It is important to point out that the stations 29 and 31 are arranged, contrary to those in conventional packaging lines, in line with the sections upstream, i.e. with the forming member and with the conveyors, which, in a manner described in greater detail hereunder, perform superposing of multiple layers of ordered products. Therefore, in substance, the entire packaging line extends according to a straight line in a plan view, said line coinciding with the direction of feed f of the products and consequently with the conformation of the feed path of the products along and through the various stations forming the packaging line.

Now describing the various sections or portions of which the line is composed in greater detail, the feed conveyor 5 comprises two lateral flexible members 101, for example two continuous lateral belts or two chains 101, driven around chain wheels or pulleys 103 (FIGS. 1A, 2A) with horizontal axes. The two belts 101 extend in two respective vertical planes and fixed thereto are crossmembers 105 forming pusher members for pushing single layers S each formed by an ordered arrangement of products R. The products R are pushed by the crossmembers 105 along a sliding surface 107, which is still part of the conveyor 5. The assembly formed by the pair of belts 101 and by the surface 107 oscillates according to the double arrow f5 about an axis, which is substantially horizontal and transverse with respect to the direction f of feed of the products R. In practice, the initial part of the conveyor remains at a fixed height, while the final or unloading part of the conveyor 5 (on the right in the drawing) is movable between two positions indicated with a solid line and with a broken line respectively. By taking the unloading end of the conveyor 5 to two distinct heights, said oscillating movement according to f5 allows the layers S of product R to be distributed alternately on one or other of the two conveyors 9 and 11 of the subsequent section 7.

The conveyor 9 has (FIGS. 1A, 2A and 5) a conformation substantially equivalent to that of the conveyor 5 described previously. It comprises a pair of continuous belts 113 driven around respective pulleys 115 with substantially horizontal axes. The belts 113 carry pushing members constituted by crossmembers 117 which, analogous to the crossmembers 105 of the conveyor 5, push the layers S of products onto a sliding surface 119. As can be seen in particular in the side view (FIG. 1) the conveyor 9 oscillates according to the double arrow f9 to take the delivery end thereof to two different positions, i.e. to two different heights to unload the single layers of ordered products R on different levels. As mentioned above, the two conveyors 13A and 13B are disposed at these levels, downstream of the conveyor 9.

In practice, each of the conveyors 13A, 13B is constituted by a pair of belts 131 driven around pulleys 133 and between the belts 131 there are constrained crossmembers 135 acting as pushers. Each conveyor 13A, 13B has a respective sliding surface 137A, 137B. The two sliding surfaces 137A, 137B are disposed at two different heights or levels and the layers S of products R are made to slide therealong, as a result of the push exerted by the crossmembers 135.

Contrary to the conveyors 5 and 9, the conveyors 13A, 13B do not oscillate. The two layers S which are fed to the two conveyors 13A, 13B are pushed by these in synchronism towards the delivery conveyor 15 so that, upon leaving the sliding surfaces 137A, 137B, the two layers of products located simultaneously on said surfaces are positioned one on top of the other on the delivery conveyor 15, the structure of which will be described in greater detail hereunder.

The conveyor 11 (FIGS. 1B, 2B, 5, 6) extends above the conveyor 9, and comprises, in the example shown, a plurality of conveyor belts described hereunder. In the first place, the conveyor 11 comprises a lower conveyor belt 141 driven around rollers 143 with substantially horizontal axes. Along the sides of the conveyor belt 141 two lateral retaining guides 145 are arranged, while the lower conveyor belt 141 forms a support for the layers S.

The belt 143 is followed by a further conveyor belt 149 driven around rollers 151 with substantially horizontal axes. The conveyor belt 149 extends in the main feed direction f.

Downstream of the horizontal conveyor belt 149 there is arranged a further conveyor belt 153, which is inclined and driven around rollers 155 with substantially horizontal axes.

The upper branch of the inclined conveyor belt 153 is aligned with an inclined surface 157 forming an extension of the inclined conveyor belt 153 and also part of the conveyor indicated as a whole with 11.

Above the inclined conveyor belt 153 and the inclined surface 157 there extend two continuous belts or continuous chains 159, which are driven around respective pulleys or chain wheels with horizontal axes 161. Between the belts or chains 159 there extend crossmembers 163 forming pushing elements for pushing the layers S of products R, which are located on the conveyor belt 153 or on the surface 157 forming the extension thereof. In substance, therefore, while in the first section of the conveyor 15 feed of the rolls R forming the layers S occurs as a result of the conveying movement by the horizontal conveyor belts 141 and 149, in the second section of the conveyor 11 feed occurs, analogous to the conveyors 5 and 9, by pushing by the crossmembers 163 constrained to the two belts 159. In the first section of the lower branch of the belts 159 the products R arranged in layers S are fed also as a result of the movement of the inclined conveyor belt 153, which allows the products transferred from the conveyor belt 159 upstream thereof to be fed beyond the point in which the crossmembers 163 can engage the layers S of product R from behind.

Instead of the assembly of belts 141, 149, there can be provided a conveyor similar to the conveyor with belts or chains and crossmembers such as the one indicated with 101, 105 in section 5 of the line. A solution of this type is illustrated in the modified embodiment in FIG. 7, where the same numbers indicate elements identical or equivalent to those in the previously described figures.

The delivery conveyor, indicated as a whole with 15 and briefly mentioned above, is in actual fact in turn formed by a series of conveyor belts. In the first place the conveyor 15 comprises a horizontal lower conveyor belt 171 driven around rollers 173 with substantially horizontal axis. At the side and above the conveyor belt 171 there are disposed two superposed lateral conveyor belts 175. In the plan view the drive pulley 177 is also visible, associated with each lateral conveyor belt 175 to supply motion thereto. Reference number 179 indicates further idle pulleys of the lateral conveyor belts 175.

Above the initial section of the conveyor belt 171 and at a greater height with respect to the lateral conveyor belts 175 there is disposed a further horizontal conveyor belt 181 driven around rollers 183. Conversely, above the end part of the conveyor belt 171 and at a greater height with respect to the conveyor belts 175 a further horizontal conveyor 185 is arranged, which is driven around rollers 186 with substantially horizontal axes. Between the conveyor belt and the lateral conveyor belts 175 below a further conveyor belt 187 is arranged on each side of the conveyor 15. As can be seen in the plan view, each lateral conveyor belt 187 is driven around pulleys 189 and 191. These pulleys are coaxial with the corresponding pulleys 179. The conveyor belts 187 receive motion from pulleys, indicated again in the plan view with 177, coaxial with the pulleys that supply motion to the lateral conveyor belts 175 below. The upper horizontal conveyor belt 185 and the lateral conveyor belts 187 start in a position substantially coincident with the end of the inclined surface 157, along which the products R are pushed by the crossmembers 163 constrained to the aforesaid belts 159. The height at which the horizontal conveyor belts 185 and vertical conveyor belts 187 are located is also coincident with the height at which the products R are released by the inclined surface 157. This height is substantially equivalent to twice the height of a single layer S of products R, so that, as shown in the figure, the layer S pushed along the inclined surface 157, i.e. that is fed from the conveyor 11, is superposed on the two layers S previously released onto the conveyor 15 from the two inclined surfaces of the conveyors 13A, 13B. In substance, therefore, in the end section of the delivery conveyor 15, i.e. in the area in which the upper pair of conveyor belts 187 are disposed, there are three superposed layers S of products.

Downstream of the horizontal conveyor belts 185 and 171 further conveyor belts 193 and 195 are arranged, which are substantially parallel to each other, i.e. having opposite branches substantially parallel and disposed at the same height as the conveyor belts 185, 171 respectively. The lateral conveyor belts 175, 187 extend at the sides and between the horizontal conveyor belts 193, 195. In this way, in substance the compound conveyor 15 extends up to the inlet of the forming collar 19. This collar has a structure known per se and will therefore not be described in detail herein.

The sequence of FIG. 3A-3K shows how a group G of three layers S of products R is formed. This sequence, in which only some of the mechanical elements are shown and referred to, shows the movement of three layers of products R, indicated with S1, S2, and S3. It must be understood that in actual operation these three layers will be introduced in a substantially continuous flow of preceding and succeeding layers, to allow the line to work continuously and at high speed.

In FIG. 3A the three layers S1, S2, S3 are disposed on the feed conveyor 5 and are positioned at more or less even distances from one another. In FIG. 3B the conveyor 5 is oscillated downward, to unload the layers S1 and S2 onto the conveyor 9. In FIG. 3C the layers S1 and S2 are on the conveyor 9 while the layer S3 is still on the feed conveyor 5.

To unload the layer S3 onto the conveyor 11 above, the conveyor 5 oscillates upward (FIG. 3D). The oscillating movement takes place in very short times, during which feed of the layers S1, S2, S3 continues.

In FIG. 3E the layer S3 is on the conveyor 11 and is fed at a higher level with respect to the layers S1, S2.

FIG. 3F shows the step in which the layer S1 has been pushed onto the conveyor 13A, while the layer S2 is still on the conveyor 9 and the layer S3 on the conveyor 11. Rapid upward oscillation of the conveyor 9 takes the delivery end thereof to the height of the conveyor 13B, to allow the layer S2 to be pushed onto the sliding surface 137B of the upper conveyor 13B, while the layer S3 continues to be fed on the conveyor 11.

In FIG. 3H both layers S1 and S2 are on the superposed conveyors 13A and 13B respectively, while the layer S3 is on the conveyor 11 above, approximately above the layers S1 and S2.

Subsequently, the layers S1 and S2 are unloaded substantially simultaneously onto the conveyor belt 171 of the delivery conveyor 15, while the layer S3 starts to slide on the inclined surface 157 (FIG. 3I).

In FIG. 3J the layers S1, S2 and S3 are approximately superposed and are fed together on the belt 171 towards the forming collar 19, which they enter in a superposed arrangement (FIG. 3K).

It is understood from the sequence illustrated in FIGS. 3A-3K that forming of the group G of ordered products by superposing of single layers S takes place without the need to interrupt the flow of layers along the main feed direction, indicated with f. The conveyor 5 performs synchronization of the third layer S3 with respect to the layers S1, S2 below, accelerating or decelerating to ensure that it is superposed on the layers S1, S2 when these are fed on the delivery conveyor.

By simply deactivating the swinging movement of the first conveyor 5 it is possible, using the same device, to form groups G formed of only two layers of products, using the swinging conveyor 9 and maintaining the swinging conveyor 5 in the position indicated with a broken line in FIG. 1A. By stopping the swinging movement of the conveyor 9 and maintaining it in the position in FIG. 1A, groups G formed of a single layer can be formed.

It would also be possible to replace the conveyor 11 with a feed system comprising in turn a swinging conveyor similar to the conveyor 9, to form series of products comprising two layers, which are then fed synchronously with the series of two superposed layers formed by the conveyors 13A, 13B, to obtain groups G of four layers at the outlet.

According to a different embodiment of the invention, instead of providing two swinging conveyors 5 and 9 in series, it would also be possible to provide a single swinging conveyor that distributes the layers S on three (or more) distinct levels, at each of which there is a conveyor analogous to the conveyor 13A or 13B or equivalent feed system. The feed movement can be controlled so as to synchronize the movement of the single layers on the single levels, which are then unloaded on top of one another on the delivery conveyor. Stacking can take place, as in the case described, by superposing first two layers and then placing the third layer on top of this group of two layers.

Moreover, while a method and a device have been described in which a first set of two layers is formed on the lower level and a single layer is fed on the upper level and suitably synchronized to be subsequently superposed on the set of two layers below, it would also be possible to operate in the opposite way, forming a set of two or more layers on the upper level which is then superposed on a single layer below.

Downstream of the forming member 17 comprising the forming collar 19 and the other elements 21, 23 mentioned above, and the perforator 24 that perforates the film F along lines at which the tube formed by the forming collar 19 will be detached, i.e. severed by the device 23 to form single lengths wound around each group G of products R disposed in layers, there are arranged a pair of horizontal conveyors 201 that transfer each single group G of products R disposed in layers S towards an orienting conveyor 25, which will be described in greater detail hereunder.

At the inlet of the orienting conveyor 25 the groups G of products disposed in layers S are wrapped in the single lengths SP of plastic film wound tubularly so that the free ends L of these lengths project upstream and downstream (with respect to the direction f of feed) from the group G of ordered products. In the folding and sealing sections 29, 31, said side flaps must be disposed with a transverse alignment with respect to the direction of feed f, i.e. they must be facing the sides of the path followed by the groups of ordered products. The purpose of the orienting conveyor 25 is to rotate each single group G of products R through approximately 90° about an approximately vertical axis, to take the flaps L of the lengths SP of plastic film F from the position aligned along the direction f to the position aligned orthogonally to the direction of feed f.

For this purpose in the example shown the orienting conveyor 25 has a first series of lower continuous flexible elements 211, for example belts, defining a horizontal conveyor with the upper branch thereof. The belts 211 are driven around respective pulleys 213, 215, 217 with substantially horizontal axes, the pulleys 215, 217 defining the feed and delivery position of the orienting conveyor 25.

Between the pulleys 213, mounted idle on the respective axles, there is disposed a series of coaxial pulleys 219 mounted on a common motor axle, or on two common motor axles. In the plan view (FIG. 2C) the common axle or shaft is indicated with 221 and 223 indicates an electric motor that controls the rotational movement of the shaft 221 and therefore of the two pulleys 219 keyed thereon. A second motor 223X, indicated with a broken line, could be coupled with a second shaft 221X, again indicated with a broken line, in the event of the pulleys 219 being keyed onto two coaxial motor shafts 221, 221X and with two motors.

As can be seen in the plan view, the pulleys 219 have a gradually decreasing diameter starting from the first pulley (on the left of the production line observing it in the direction of feed f of the products) towards the right. This means that the belts or other flexible elements 211 have a different speed from one another and more specifically the belt 211 on the left (again observing it in the direction of feed f) has a higher feed speed with respect to the adjacent belt, and so forth, the belt 211 on the far right being the slowest.

As a consequence of this arrangement, each group G of products R ordered in layers and wound in a length SP of plastic film is subjected to a torque generated by the friction between the belts 211 and the outer surface of the plastic film of the length SP and caused by the gradually different speed in transverse direction of the belts 211. This causes a rotation of the group G of products as can be observed in the plan view in FIG. 2C and in the side view in FIG. 1C, in which there are simultaneously three groups G of products on the orienting conveyor 25: one in the feed area, still with the original orientation, one in an approximately intermediate position, rotated through 45°, and a third in proximity to the delivery area, rotated practically through 90° with respect to the initial position.

To improve this effect of rotation through 90° which is obtained during the feed movement along the path according to the direction of feed f of the groups G of products R, above the assembly of belts 211 is a second and symmetrical assembly of belts 212 or other continuous flexible elements. The belts 212 are guided and controlled in movement with an arrangement of pulleys symmetrical with respect to the arrangement of pulleys 213, 215, 217, 219 and with one or two motors equivalent to those indicated with 223 and 223X for the lower group of belts 211.

In this way, the two groups of belts 211, 212 exert a double twisting action on opposite horizontal faces of each group G of products wound in the respective length SP to obtain the desired rotation about the vertical axis through 90° of the group of ordered products.

As can be seen in FIGS. 1C, 2C, at the outlet of the orienting conveyor 25 the flaps L of the length SP of plastic film that wraps each group G of products R ordered in layers S are facing the sides of the packaging line, as required for subsequent folding and sealing of said flaps according to known techniques and with known means, not described.

The structure and the function of the corrector device 27 located downstream of the orienting conveyor 25 is illustrated with reference to FIGS. 1C, 2C, 1D, 2D.

The device 27 is formed, in this embodiment, by two pairs of horizontal conveyor belts: an upper pair 231 and a lower pair 233 respectively. The number 235 indicates drive rollers of the two upper belts 231 and 237 indicates the drive rollers of the lower belts 233.

As can be observed in particular in the plan view, not only are the upper and lower belts double, but each of them is driven around a respective pair of rollers, so that the relative speed of one conveyor with respect to the other can vary for the purposes described hereunder.

A system for detecting the orientation of the single groups G of ordered products R is arranged at the inlet of the corrector device 27. In the example shown the detection system comprises two photocells 241 aligned in a direction orthogonal to the direction of feed f of the ordered in groups G of products R. These photocells are able to detect any angular positioning errors of the groups, i.e. are able to check if the groups G are not oriented (within certain admissible error margins) with the lateral surfaces thereof parallel to the direction of feed f. Any angular errors generate an error signal by the photocells 241, which triggers a correction process performed by the corrector device 27.

This correction process requires a difference in speed to be generated between the two conveyor belts of each pair of upper belts 231 and lower belts 233. It is understood that the difference in speed between the two belts on each level will be the same for the pair of upper belts 231 and for the pair of lower belts 233. This difference in speed acts on the group G of products R which is at that instant in the corrector device 27 similarly to the manner in which the belts 211 and the belts 212 cause rotation through 90° of the groups G. However, unlike these, the difference in speed is not fixed in advance by the geometry of the system, but is determined as a function of the reading taken by the detection system 241. Instead of photocells, this system can comprise a more complex viewing system, for example a still or video camera, or any other system, also not of an optical nature, which is able to detect any angular positioning errors of the single groups.

It would also be possible to integrate this function of correction in the orienting conveyor 25, positioning in the last area thereof a detection system of optical or of another kind, which influences the speed of the single belts 211, 212, although this implies a more complex construction due to the need to provide two or more motors for the belts 219 and also as a result of the fact that any correction made by varying the difference in speed between the belts 211, 212 influences the angular position not only of the last group G which is on the orienting conveyor 25, but also that of the groups G located upstream thereof. Alternatively, the orienting conveyor 25 can be made shorter and with a greater difference in speed between adjacent conveyor elements 211, or the single groups G can be disposed at a greater reciprocal distance, so that one group G is fed onto the orienting conveyor 25 when the previous group G has already been removed.

The correcting device 27 can be equipped with a further function for correction of the transverse position of the group G of products. For this purpose, the conveyor belts 231, 233 can be mounted on a support movable transversely according to the arrow fX, an actuator being provided to control movements in this direction fX as a function of any transverse positioning errors of the group G of products R ordered in layers S. Correction can be imposed by an optical detection system, such as a system with a still or video camera, or in any other suitable manner. The same detector can be used to detect angular positioning errors and transverse positioning errors of the groups G of products R.

At the outlet of the corrector device 27 the single groups G wrapped in the lengths SP of tubular film will thus be angularly and transversely positioned correctly to allow folding and sealing of the flaps L of film with known methods.

It must be understood that the corrector device 27 can also take different configurations with respect to that illustrated. For example, in a first modified embodiment, the upper conveyor belts 231 could be removed.

In a second modified embodiment (see FIG. 4) the corrector device 27 can comprise a continuous flexible member 251, for example formed by a pair of belts disposed on two parallel vertical planes, which carry one or more pushers in the form of blades 253. The arrangement is such that the blades 253 follow a closed path P1 along which a first section is identified parallel to a sliding surface 255, along which the blades 253 advance in the same direction as the direction f of feed of the products, and a second return section. This arrangement allows any angular errors to be corrected, as the push exerted by the blades 253 on the groups G of products R forces them to take a position with the face thereof in contact with the blades 253 parallel thereto, and the blades will be constrained to lie in a vertical plane orthogonal to the direction f of feed of the groups G of products. Correction of transverse positioning errors can for example take place by supplying a portion of the surface 255 with a transverse movement controlled in the same way as described with reference to the transverse movement of the conveyor belts 231, 233. In FIG. 4, 255A indicates a portion of said surface 255 which is provided with such translational movement. Downstream of the surface 255 a conveyor belt will be appropriately arranged to feed the groups G of products towards the stations 29 and 31.

Alternatively, the groups G of products can be fed on a conveyor belt at a certain speed and strike against a flat surface substantially orthogonal to the direction of feed, which moves at a lower speed with a substantially analogous effect of correcting the orientation.

It is understood that the drawing only shows an example provided by way of a practical demonstration of the invention, which can vary in forms and arrangements without however departing from the scope of the concept underlying the invention. Any reference numbers in the appended claims are provided to facilitate reading of the claims with reference to the description and to the drawing, and do not limit the scope of protection defined by the claims.

The invention claimed is:

1. A method for packaging groups of ordered products using sheet material, comprising:
   feeding in sequence groups of ordered products along a first feed path extending according to a direction of feed;
   feeding each group of said groups of ordered products through a forming member, disposed along said first feed path, by which there is formed a tube of sheet material;

wrapping said each group of ordered products with a length of said tube of sheet material, said length being sufficient to provide end flaps projecting from said each group, said end flaps being disposed in front of and behind said each group of ordered products with respect to the direction of feed of said groups of ordered products along said feed path;

rotating said each group, with the length of tube of sheet material respectively, by approximately 90° while said each group is fed along said feed path, to orient said each group so that said end flaps are facing each side respectively of said feed path;

inserting said each group in a flap folding station which includes folding members arranged at the sides of the feed path to fold and close said end flaps.

2. The method according to claim 1, wherein said rotating of said each group of ordered products is by an orienting conveyor which has continuous conveying elements substantially parallel to the direction of feed and are controlled at different speeds from one another to impose said rotating on the groups of ordered products.

3. The method according to claim 1, further comprising in said feeding of said each group of ordered products through said forming member, arranging said groups of ordered products in a sequence of lengths not yet separated of said tube of sheet material;

separating the tube of sheet material with the groups of ordered products therein according to the length of sheet material including the end flaps thereof projecting in front of and behind said each group of ordered products with respect to the direction of feed of said groups of ordered products along said first feed path.

4. The method according to claim 1, further comprising detecting positioning errors of said groups of ordered products after rotation thereof and correcting said positioning errors.

5. The method according to claim 4, wherein said positioning errors comprise angular positioning errors.

6. The method according to claim 5, wherein said angular positioning errors are corrected by bringing said groups of products into contact simultaneously with at least two continuous conveyors controllable at different speeds as a function of the errors detected.

7. The method according to claim 5, wherein said angular positioning errors are corrected by bringing said groups of ordered products into contact with a pushing surface substantially orthogonal to the direction of feed.

8. The method according to claim 4 wherein said positioning errors comprise lateral positioning errors.

9. The method according to claim 8, wherein said correcting of said lateral positioning errors is by imposing on said groups of ordered products a translation in a direction approximately orthogonal to the direction of feed.

10. The method according to claim 1, further comprising:
feeding single layers of said products in sequence;
superposing on one another at least two of said single layers of said products to form said groups of ordered products.

11. The method according to claim 10, wherein said superposing of layers is performed along a second feed path extending in a substantially rectilinear direction of feed and, along said second feed path, inserting the single layers into the tube of sheet material and separating said tube to provide said single length of sheet material around said each group, rotating said each group wrapped in a respective one of said length of the sheet material, folding and closing of said end flaps.

12. A packaging machine for packaging groups of ordered products with a sheet material along a feed path extending in a direction of feed of said groups comprising:

a forming member, which forms a tube of sheet material through which said feed path extends, and wherein a single length of said tube is formed around a respective group of said groups of ordered products;

a folding station, downstream of said forming member, to fold flaps of said single length of said tube which project from the respective group of ordered products, said folding station having folding members arranged sideways with respect to the feed path;

between a separator member and said folding station, an orienting conveyor constructed and arranged to rotate each said respective group of ordered products by approximately 90° while said group is fed along said feed path to orient said respective group of ordered products with the flaps of the single length of sheet material facing respective sides of the feed path, before said folding members act on said respective group of ordered products.

13. The machine according to claim 12, wherein between said orienting conveyor and said folding station a corrector device is arranged, to correct any angular positioning errors of each said respective group of ordered products delivered from said orienting conveyor.

14. The machine according to claim 13, wherein said corrector device comprises at least one pair of substantially parallel conveyor belts controlled so that the belts can move at different speeds, and detection members to detect any angular positioning errors of said groups of ordered products, said detection members arranged to generate a control signal to control a variation in speed between said pair of conveyor belts so as to correct an angular positioning error.

15. The machine according to claim 13, wherein said corrector device is arranged to impose a translation on said groups of ordered products in a direction substantially orthogonal to the direction of feed, to correct any transverse positioning errors, and a detection system provided to detect said transverse positioning errors.

16. The machine according to claim 13, wherein said corrector device has a member defining a reference surface for said groups of ordered products substantially orthogonal to the direction of feed.

17. The machine according to claim 12, wherein said orienting conveyor comprises a plurality of substantially parallel continuous flexible conveyor elements arranged side by side, controlled at different speeds from one another to cause feed and simultaneous rotation of said groups of ordered products.

18. The machine according to claim 17, wherein said orienting conveyor further comprises a second plurality of continuous flexible conveyor elements arranged side by side with one another and substantially parallel to the first plurality of continuous flexible conveyor elements.

19. The machine according to claim 18, wherein conveyor elements of said second plurality of flexible conveyor elements are driven around drive pulleys of different diameters keyed onto at least one driving shaft.

20. The machine according to claim 19, wherein said drive pulleys of the second plurality of flexible conveyor elements are keyed onto two driving shafts operated by two distinct motors.

21. The machine according to claim 12, wherein said orienting conveyor comprises at least a first plurality of continuous flexible conveyor elements, substantially parallel to and side by side with one another, said flexible conveyor elements being operated at different speeds from one another, wherein difference in the speeds between said flexible conveyor elements causes feed and simultaneous rotation of said groups of ordered products.

22. The machine according to claim 21, wherein conveyor elements of said first plurality of flexible conveyor elements are driven around drive pulleys of different diameters keyed onto at least one driving shaft.

23. The machine according to claim 22, wherein said drive pulleys of the first plurality of flexible conveyor elements are keyed onto two driving shafts operated by two distinct motors.

24. The machine according to claim 12, wherein said forming member comprises in combination:
   a member for unwinding the sheet material from a reel;
   a perforator to perforate said sheet material along substantially transverse lines;
   a forming collar; and
   downstream of the forming collar, the separator member in which single lengths of said tube are formed respectively around said groups of ordered products.

* * * * *